United States Patent
Bright, II

(10) Patent No.: US 8,001,717 B1
(45) Date of Patent: Aug. 23, 2011

(54) COLLAPSIBLE FISHING BAIT PEN

(76) Inventor: Donald S. Bright, II, Garner, NC (US)

(*) Notice: Subject to any disclaimer, the term of this patent is extended or adjusted under 35 U.S.C. 154(b) by 207 days.

(21) Appl. No.: 11/742,899

(22) Filed: May 1, 2007

(51) Int. Cl.
*A01K 97/05* (2006.01)

(52) U.S. Cl. .......................................................... 43/55

(58) Field of Classification Search ................... 43/7, 12, 43/55, 56, 100
See application file for complete search history.

(56) References Cited

U.S. PATENT DOCUMENTS

| | | | | |
|---|---|---|---|---|
| 2,814,899 A | * | 12/1957 | Brosius | 43/12 |
| 3,233,279 A | * | 2/1966 | Edgar | 452/100 |
| 3,919,803 A | * | 11/1975 | Manguso | 43/55 |
| 3,990,463 A | * | 11/1976 | Norman | 135/126 |
| 4,251,943 A | * | 2/1981 | Sawlsville | 43/55 |
| 4,753,423 A | | 6/1988 | Ukai et al. | |
| 4,890,413 A | * | 1/1990 | Nelson et al. | 43/55 |
| 4,914,856 A | * | 4/1990 | Kennedy | 43/55 |
| 5,561,936 A | * | 10/1996 | Franke | 43/7 |
| 6,135,046 A | | 10/2000 | Beech | |
| 6,178,684 B1 | * | 1/2001 | Nyakas et al. | 43/12 |
| 6,662,488 B1 | | 12/2003 | Heimbrock et al. | |
| D507,621 S | | 7/2005 | Beech | |
| 6,990,765 B1 | | 1/2006 | Beech | |
| 2005/0039378 A1 | | 2/2005 | Beech | |
| 2005/0279014 A1 | | 12/2005 | Beech | |
| 2006/0112610 A1 | * | 6/2006 | Philbrook | 43/100 |

OTHER PUBLICATIONS

Mediacollege.com, (Feb. 14, 2005), http://web.archive.org/web/20050214221019/http://www.mediacollege.com/lighting/equipment/reflector-board.html.*

* cited by examiner

*Primary Examiner* — Rob Swiatek
*Assistant Examiner* — Valentina Xavier
(74) *Attorney, Agent, or Firm* — Coats & Bennett, P.L.L.C.

(57) ABSTRACT

A fishing bait pen includes an upper floating member and a lower member having a specific gravity that enables the lower member to sink in water. A sidewall extends generally between the upper floating member and the lower member. A bottom is provided adjacent the lower member. The wall and bottom include a series of openings for permitting water to flow into and out of a fishing bait pen. Both the upper floating member and the lower member are sufficiently flexible such that each can be bent at multiple points and folder over to form a collapsed configuration.

18 Claims, 6 Drawing Sheets

COLLAPSIBLE FISHING BAIT PEN

FIELD OF THE INVENTION

The present invention relates to fishing bait pens, and more particularly to a collapsible fishing bait pen.

BACKGROUND

Fishing bait pens are known. Typically fishing bait pens include two spaced apart members having a netting extending between them as well as a bottom netting. When disposed in the water, these fishing bait pens float because one of the two spaced apart members is buoyant. The other spaced apart member sinks in the water, thereby causing the fishing bait pen to form a submerged bait pen.

Furthermore, the spaced apart members are usually constructed of PVC piping. While these PVC pipe sections may be slightly flexible, they cannot be collapsed. Also, while the spaced apart members comprising PVC pipe can be positioned together thereby decreasing the height of the fishing bait pen, the PVC pipes themselves cannot be bent and folded over each other so as to reduce the effective diameter or cross-sectional area of the fishing bait pen.

This is of considerable concern because fishing bait pens are carried by fishing boats, and particularly sport fishing boats, and have very little storage area. Often these fishing bait pens are stored on a T-top that forms a part of a boat. In any event, storage space on a boat is minimal and because of the use of PVC pipe in fishing bait pens, they cannot be collapsed down to a relatively small size.

SUMMARY

The present invention entails a collapsible fishing bait pen having an upper floating member or support and a lower member. Extending between the upper floating member and the lower member is a sidewall, and disposed adjacent the lower member is a bottom. One or more openings are provided in the sidewall or the bottom to permit water to flow into and out of the fishing bait pen. Both the upper floating member and the lower member are sufficiently flexible such that each can be bent at multiple points and folded over to form a collapsed configuration.

In one particular embodiment, the fishing bait pen is adapted to assume a collapsible configuration where the upper and lower members are twisted into a FIG. 8 configuration and half sections of the FIG. 8 configuration are overlapped to form the collapsed configuration.

In another aspect of the present invention, a method of collapsing a fishing bait pen is provided. This method includes positioning an upper floating member and a lower member in side-by-side relationship. Together the upper floating member and lower member are twisted into a FIG. 8 configuration and half sections of the FIG. 8 configuration are overlapped or bent over one another to form the collapsed configuration.

DESCRIPTION OF EXEMPLARY EMBODIMENT

Figure 1:
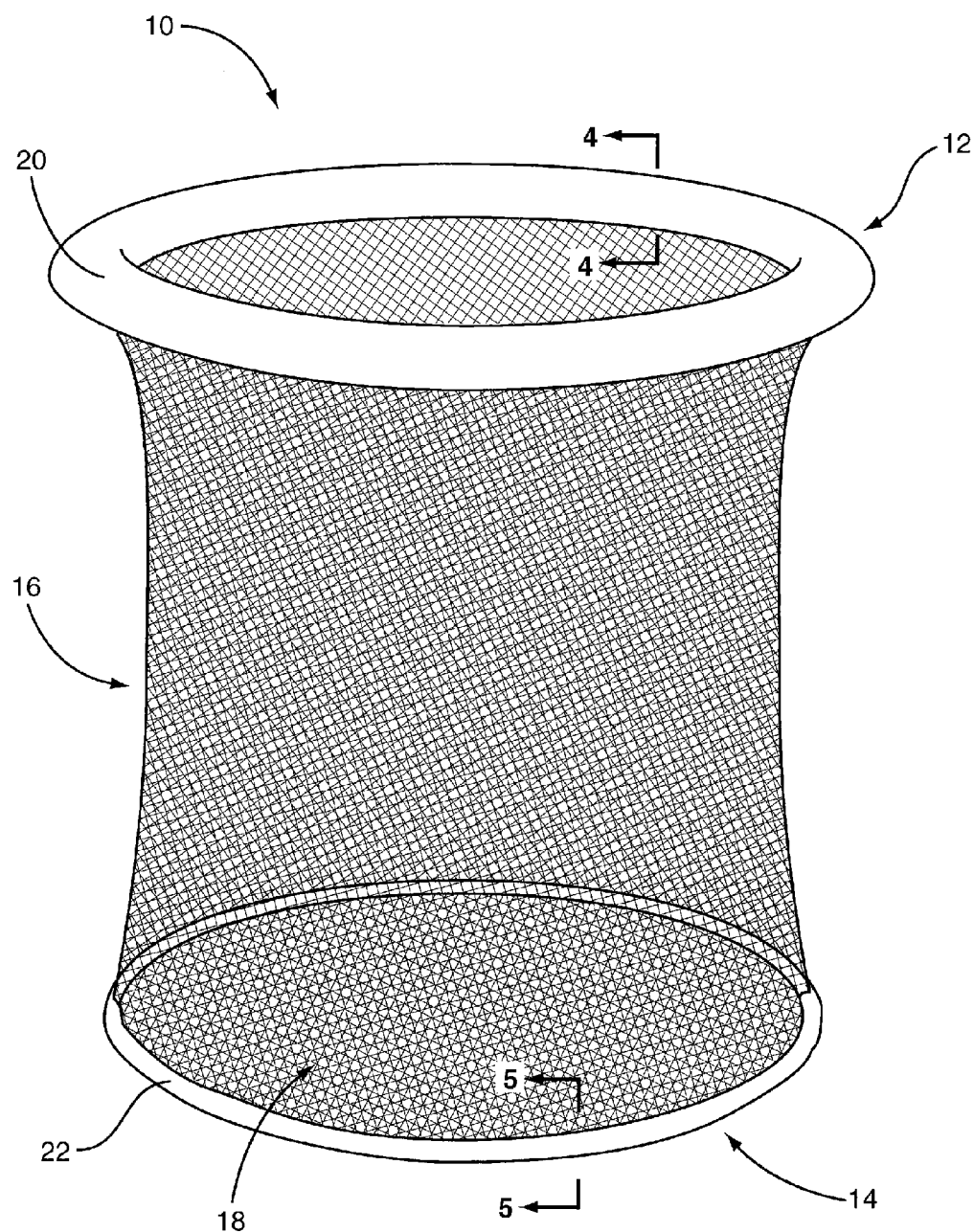
FIG. 1 is a perspective view of fishing bait pen shown in the operative or non-collapsed configuration.

With further reference to the drawings, the fishing bait pen of the present invention is shown therein and indicated generally by the numeral 10. As shown in FIG. 1, the fishing bait pen assumes an operative mode or configuration. When the fishing bait pen 10 is used it is usually disposed adjacent a boat and submerged in water with a top portion of the pen floating at the surface of the water and the bottom of the pen disposed beneath the surface of the water. Bait such as menhaden is confined within the pen 10. As will be described in greater detail subsequently herein, the fishing bait pen 10 is designed to be folded into a compact collapsed configuration for convenient storage. Details of how the fishing bait pen is transformed from a non-collapsed configuration to a collapsed configuration will be discussed in detail later.

Turning to the structure of the fishing bait pen 10, the same comprises an upper floating member or support indicated generally by the numeral 12. Upper floating support 12 is adapted to float on the surface of the water, and in the embodiment illustrated herein, assumes a generally circular or arcuate configuration.

Also forming a part of the fishing bait pen 10 is a lower member indicated generally by the numeral 14. Lower member 14, in a non-collapsed mode, assumes a circular or arcuate configuration similar to that of the upper floating support 12. However, in the case of the lower member 14, the structure thereof is selected such that its specific gravity is greater than 1, which means that the lower member 14, when disposed in the water, sinks.

Fishing bait pen 10 includes a netting that forms a sidewall indicated generally by the numeral 16, and a bottom, indicated generally by the numeral 18. This netting, because of its openings, enables water to enter into and flow out of the fishing bait pen 10. Note in FIG. 1 where the side or sidewall 16 extends generally between the upper floating support 12 and the lower member 14. Bottom 18 extends generally across the lower member 14 and is generally supported by the lower member 14.

An upper sheathing 20 constructed of fabric, netting, vinyl material, or other suitable pliable material generally extends around the upper floating support 12 and connects to the netting. More particularly, the upper sheathing 20 connects to the sidewall 16 and effectively connects the sidewall 16 with the upper floating support 12. When the fishing bait pen is disposed in an operative configuration, and at least partially submerged in water, the sidewall or side 16 depends downwardly from the upper floating support 12 and is supported by the upper floating support.

A lower sheathing 22 extends around the lower member 14. This sheathing can also be constructed of netting, fabric, vinyl, or other suitable pliable material. Bottom 18 is connected to the lower sheathing 22 and because the lower sheathing 22 extends around the lower member 14, it follows that the lower sheathing effectively connects the bottom 18 to the lower member 14.

Figure 7A:
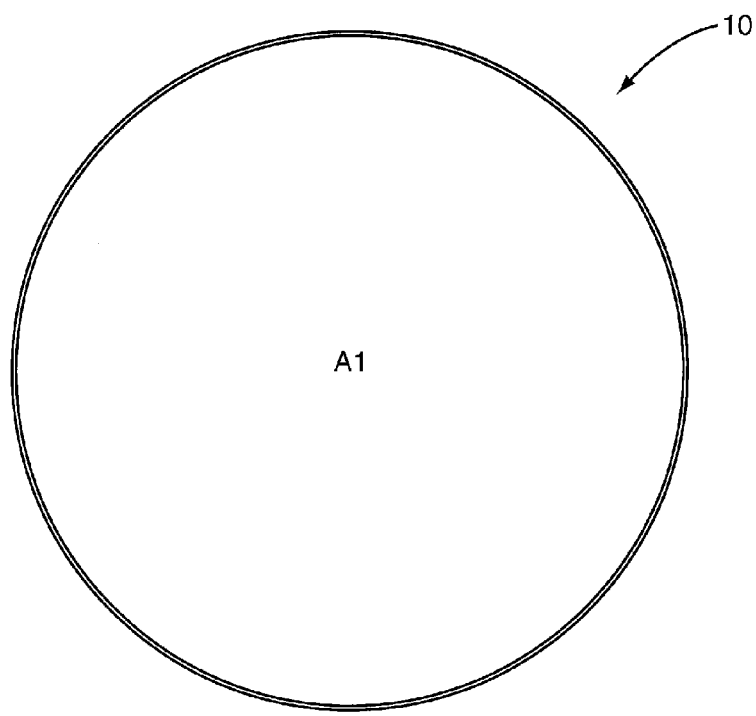
FIGS. 7A-7C schematically illustrate the fishing bait pen being transformed into a collapsed configuration and, in the process, illustrate how the cross-sectional area is reduced from the configuration shown in FIG. 7A to the configuration shown in FIG. 7C.

Upper floating member 12 and lower member 14 are designed to be flexible and capable of being formed into a compact configuration. In an operative configuration, the upper floating support 12 and the lower member 14 assume a generally open circular configuration and cause the pen to assume a generally cylindrical shape. See FIG. 1. In this open configuration, both the upper floating member 12 and the lower member 14 define a circular cross-sectional area that is indicated by A1 in FIG. 7A. As will be described subsequently herein, both the upper floating member 12 and the lower member 14 can be twisted, coiled, and/or bent to form a collapsed configuration where the effective cross-sectional area of the fishing bait pen 10, when in the collapsed configuration, is substantially less than the cross-sectional area A1.

Figure 2:
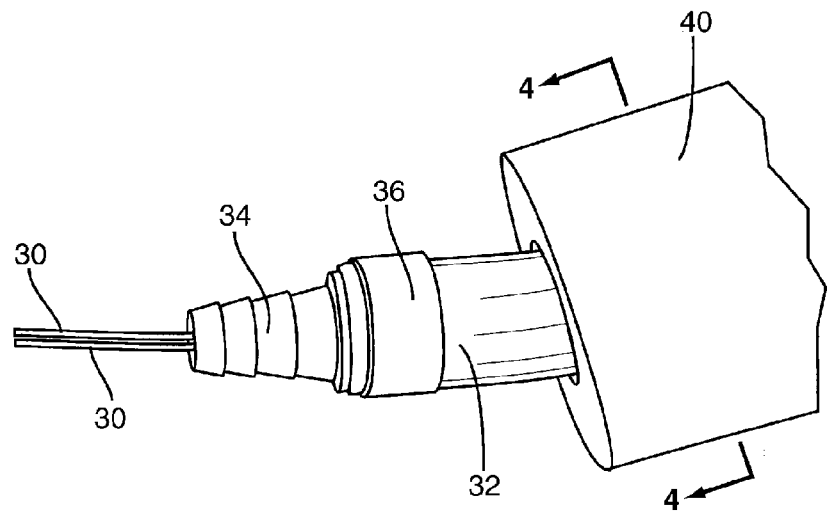
FIG. 2 is a fragmentary perspective view showing a portion of the upper support member with the spring steel strips thereof being exposed.
Figure 2A:
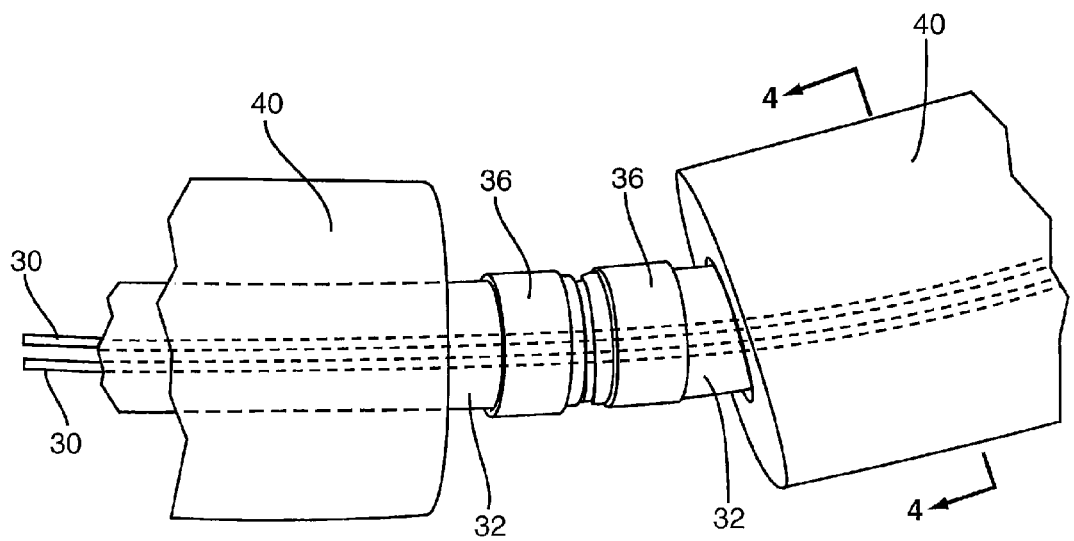
FIG. 2A is a fragmentary perspective view similar to FIG. 2 showing the sheath or pipe that forms a part of the upper support member being connected.
Figure 3:
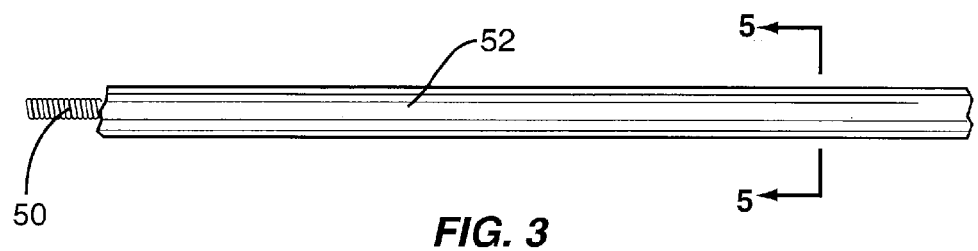
FIG. 3 is a view that illustrates a portion of the lower support member.
Figure 4:
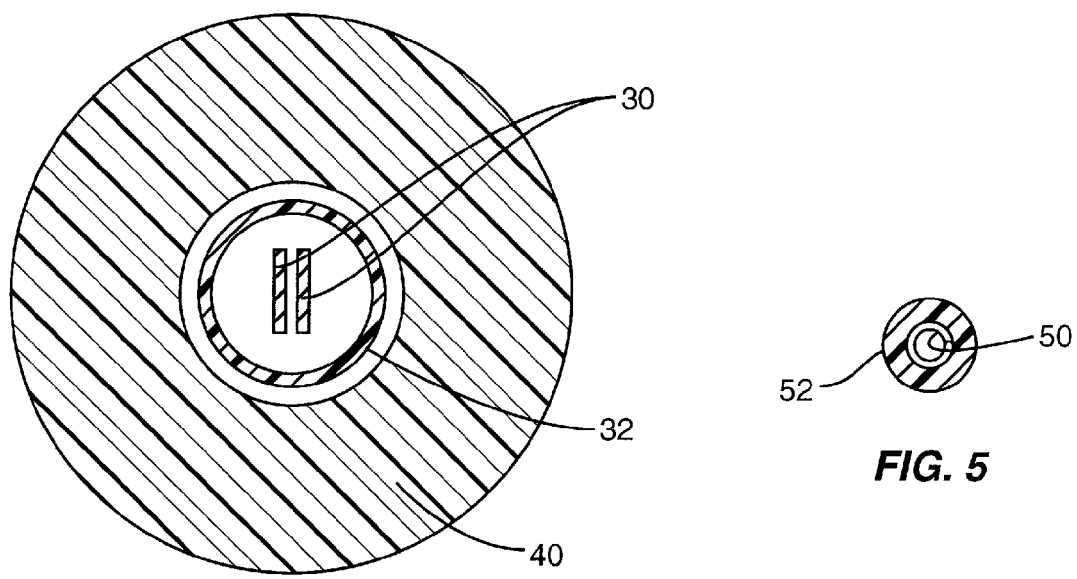
FIG. 4 is a sectional view taken through the line 4-4 of FIG. 2.

Turning to a more detailed discussion of the upper floating member 12, the same includes one or more elongated spring members 30. In the embodiment illustrated herein, the elongated spring members 30 include two pieces of spring steel. The term "steel" includes any metal. In the case of the embodiment illustrated, as shown in FIG. 2, there is provided two spring steel strips 30. Each strip is relatively thin and includes a relatively narrow width. However, the spring steel strips 30 that form a part of the upper floating member 12 are elongated. Spring steel strips 30 are flexible so as to allow the upper floating member 12 to be twisted, coiled, and even folded. See FIGS. 6A-6C.

Also forming a part of the upper floating member 12 is a plastic tube or sheath 32. Plastic tube or sheath 32 is flexible and includes an interior opening sufficiently large to receive and accommodate the spring steel strips 30. In the case of this particular embodiment, the sheath or tube 32 is sealed to protect the spring steel strips 30 from the harmful effects of salt water, or even non-salt water. Thus, the spring steel strips 30 are threaded through the sheath or plastic tube 32. To form a seal, there is provided a coupling 34 that interconnects opposed ends of the tube 32, and by utilizing compression rings 36 on each end portion of the plastic tube 32, a generally fluid tight seal can be achieved.

Also forming a part of the upper floating member 12 is a buoyant collar 40. In the embodiment shown herein, the buoyant collar 40 includes a foam sleeve having an interior opening through which the plastic tube or sheath 32 is threaded. As discussed above, the upper floating support 12 is contained within the upper sheath 20 that effectively connects the upper floating support 12 to the netting that forms the side or sidewall 16 of the fishing bait pen 10.

Turning to the lower member 14, the same includes an elongated spring member 50 contained within a plastic sheathing 52. In the embodiment illustrated herein, the elongated spring member 50 is in the form of a spring steel strip where the term "steel" includes any metal. Various types of spring steel strips or members can be used for both the upper floating member 12 and the lower member 14. However, in the embodiment illustrated herein, the spring steel strip or member 50 comprises a coil spring strip that is formed by a continuous coil of steel material having a hollow interior.

Lower member 14 in the embodiment illustrated herein is coiled in the lower sheathing 22. That is, the lower member 14 including the plastic sheathing 52 extends more than one revolution in the lower sheathing 22. In the embodiment illustrated herein, the plastic sheathing 52 completes approximately two revolutions within the lower sheathing 22. This means, of course, that there are two segments of the sheathing 52 running in side-by-side relationship in the lower sheathing 22. In some cases, the end of the steel or metal member 50 may be exposed. These exposed ends can be covered and sealed by plastic end caps.

The spring steel member 50 in the lower member 14 imparts shape and form to the lower portion of the fishing bait pen 10. That is, when the pen 10 is submerged in water, the spring steel or member 50 and the lower member 14 causes the lower portion of the pen 10 to remain open and causes the bottom to assume a generally circular configuration.

The spring steel 30 in the upper floating support 12, and the spring steel 50 in the lower member 14, are sufficiently flexible such that the upper floating member 12 and lower member 14 can be bent, twisted, coiled, or contorted into a compact, collapsed configuration for convenient storage. Because the spring steel strips 30 are confined within the plastic tube 32 and the plastic tube is housed by the buoyant collar 40, it follows that the tube 32 and the buoyant collar 40 is sufficiently flexible and bendable such that these components of the upper floating support 12 can also be bent, twisted or contorted into the compact or collapsed configuration. The same holds true for the sheathing 52 that extends around the spring steel 50 and the lower member 14.

In some cases it may not be necessary for the spring steel strips 30 in the upper floating support 12 to be sealed. For example, some spring steel or metal strips may resist corrosion and the harmful effects of water or salt water. In those cases, and other cases as well, the spring steel or metal strips 30 can simply be placed in a lightweight sheathing of any type, or simply placed within the buoyant collar 40.

Figure 6A:
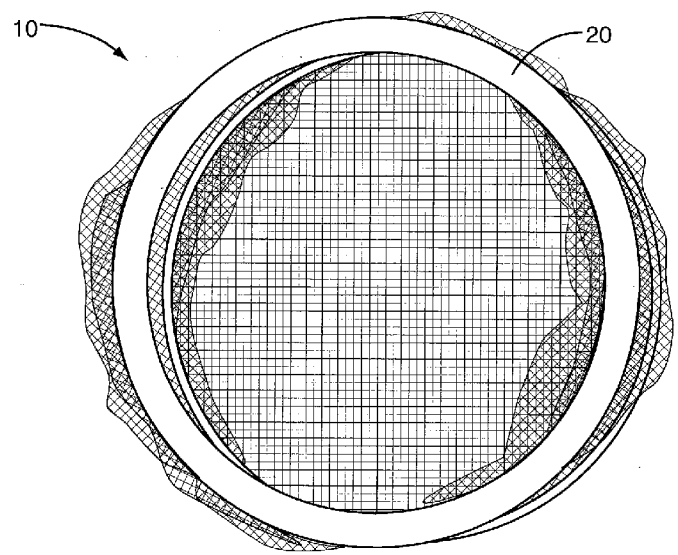
FIGS. 6A-6C illustrate the fishing bait pen being manipulated into a collapsed configuration.
Figure 6B:
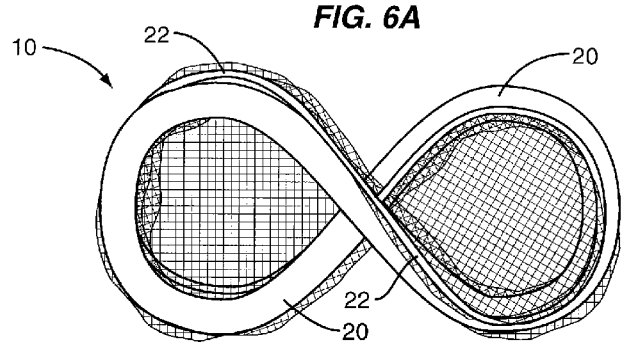
Figure 6C:
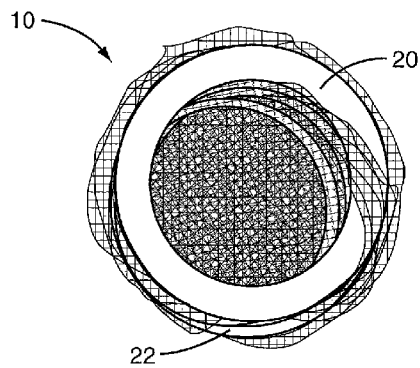
Figure 6D:
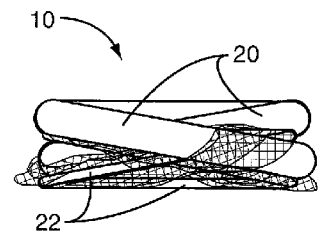
FIG. 6D shows the fishing bait pen of FIG. 6C from the side.
Figure 7B:
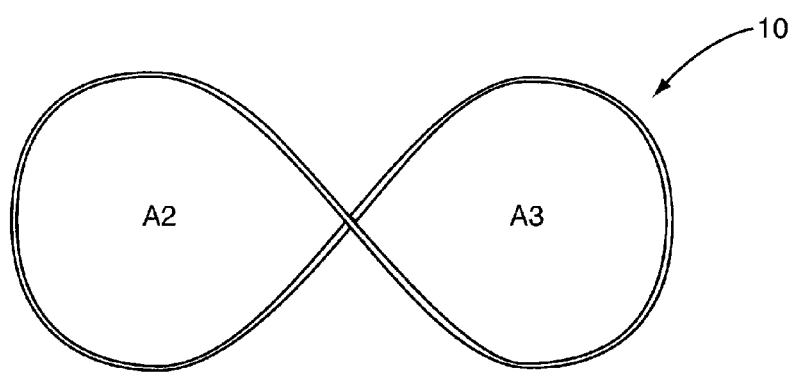
Figure 7C:
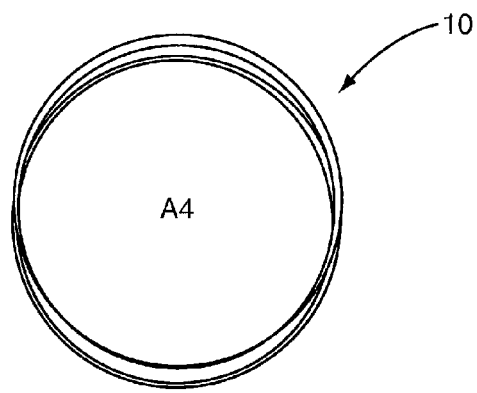
Figure 8:
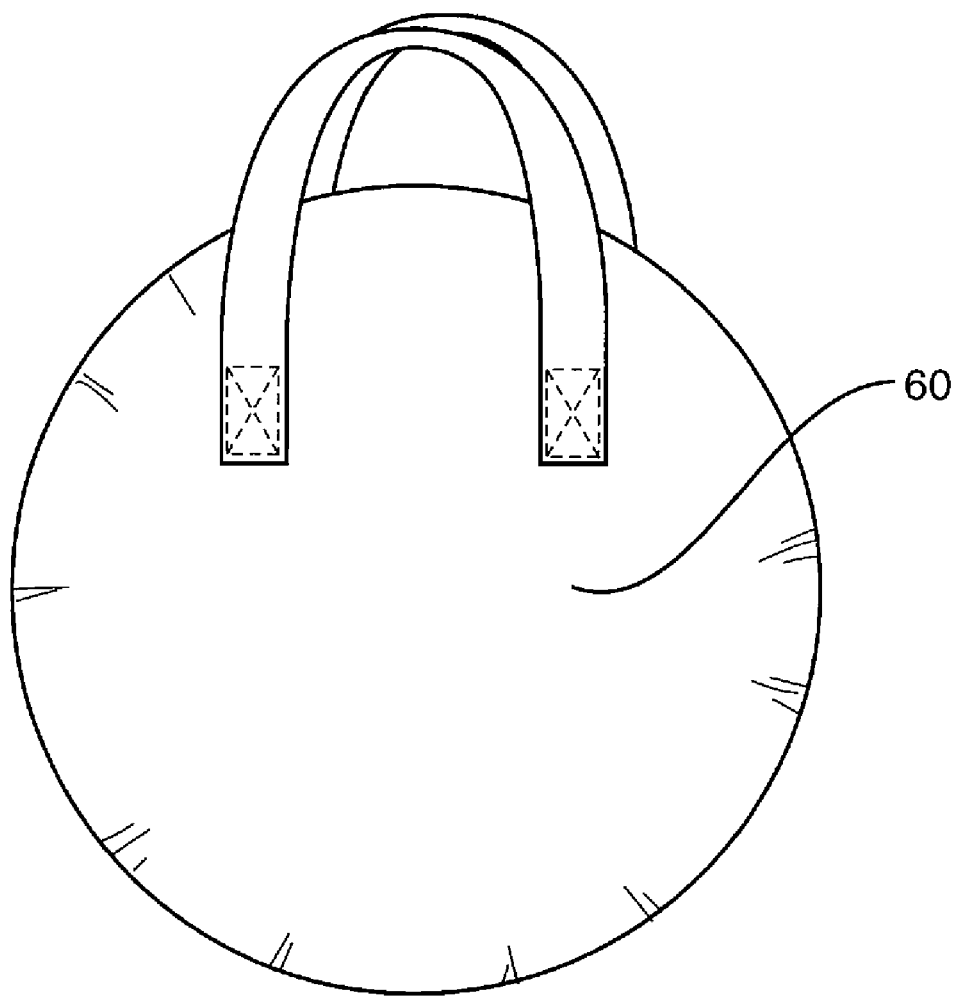
FIG. 8 is a view that illustrates a jacket or container for holding the fishing bait pen in a collapsed configuration.

The fishing bait pen 10 is shown in FIG. 1 in an operative configuration where the upper floating support 12 and the lower member 14 are expanded into a full circular configuration (open position) and the lower member 14 is spaced from the upper floating support 12 to cause the fishing bait pen to assume a generally cylindrical configuration. To transform the fishing bait pen 10 from this operative configuration to a collapsed or compact configuration, the upper floating support 12 and lower member 14 are brought together such that they extend in side-by-side relationship. Since they are approximately the same diameter, they axially align. This is illustrated in FIG. 6A. At this point the two structures, that is the upper floating support 12 and the lower member 14, are together twisted into a FIG. 8 configuration as shown in FIG. 6B. The spring steel strips 30 and 50 in the respective structures permit them to be twisted into this FIG. 8 configuration. This forms two half sections with the general cross-sectional area of each half section being referred to in FIG. 7B as A2 and A3. Now the two half sections, as shown in FIG. 6B, can be pivoted or bent at the crossing intersection such that one half section overlies the other half section. See FIG. 6C. Now the respective loops of both the upper floating support 12 and lower member 14 are disposed in side-by-side relationship, or when vertically oriented, assume a stacked configuration as shown in FIG. 6D. Note that when viewed from the top, that in this fully collapsed configuration the effective cross-sectional area is denoted A4 (FIG. 7C). This cross-sectional area is substantially less than the cross sectional area of A1. Thus, the effective cross-sectional area of the fishing bait pen 10 when disposed in the collapsed or compact configuration of FIGS. 6C and 6D is at least less than ½ of the cross-sectional area assumed in the non-collapsed or operative mode. This enables the fishing bait pen to be easily collapsed and placed into a jacket 60 for convenient storage and transport (FIG. 8).

Figure 5:
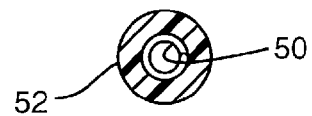
FIG. 5 is a sectional view taken through the line 5-5 of FIG. 3.
Figure 5A:
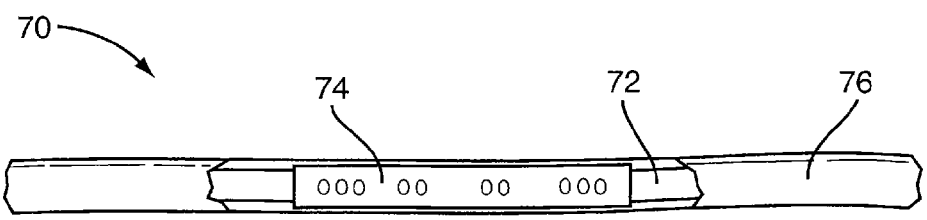
FIG. 5A is a fragmentary view showing an alternate design for a flexible member utilized in the fishing bait pen.

FIG. 5A illustrates an alternate embodiment of a spring member that can be utilized in the upper support member 12 and as the lower member 14. Shown in FIG. 5A is a flexible member indicated generally by the numeral 70. Flexible member 70 includes a member 72 that, in the embodiment illustrated, is a spring steel member constructed of oil tempered steel. Member 72 is elongated, flat and relatively thin. Opposite ends of member 72 are coupled together by a metal clamp 74. A sheathing 76 encapsulates member 72 and clamp 74. A heat shrink tubing, such as a flexible polyolefin tubing, is one example of a sheathing. Various other sheathings can be utilized. For example, a thermoplastic sheathing can be used. A flexible plastic or rubber sleeve can be slipped over member 72 and clamp 74 and heat-shrunk to encapsulate cover both the member 72 and clamp 74.

When used in the fishing bait pen 10, flexible member 70 of FIG. 5A is simply contained in the foam sleeve 40. Together the foam sleeve 40 and the flexible member 70 form the upper member 12. When used as the lower member 14, the flexible member 70 is simply contained within the lower sheathing 22. One revolution of the flexible member 70 should be sufficient to form the shape of the fishing bait pen 10 at the bottom, and also enable the lower member 14 to be manipulated between the non-collapsed configuration and the collapsed configuration.

The advantage of the present invention is that it provides a fishing bait pen 10 that in an operative mode is fully functional, but which can be easily collapsed such that its overall size is substantially reduced for easy and compact storage.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:
1. A fishing bait pen comprising:
   a. in an operative mode:
      i. a sidewall and bottom for confining fishing bait and wherein at least one of the sidewall or bottom includes one or more openings to permit water to flow through the fishing bait pen;
      ii. an upper floating support associated with the fishing bait pen that assumes a generally circular configuration and supports the fishing bait pen in the water;
      iii. the upper floating member including a buoyant sleeve and an elongated piece of flexible steel formed in a loop and extending through the buoyant sleeve;
      iv. a lower member associated with the fishing bait pen and which assumes a generally circular configuration that assists in forming the shape of the fish bait pen about a lower portion thereof;
      v. wherein in the operative mode the upper floating support and the lower member are spaced apart such that the fish bait pen includes a depth defined by a distance between the upper floating support and the lower member; and
   b. in an inoperative mode:
      i. the fishing bait pen assumes a collapsed configuration;
      ii. wherein in the collapsed configuration the upper floating support and lower member lie adjacent each other and the fishing bait pen assumes a coiled and collapsed configuration where both the upper floating member and the lower member lie adjacent each other and assume FIG. 8 configurations with half sections of the respective FIG. 8 configurations overlapped; and
   c. a flexible sheathing interposed between the buoyant sleeve and the elongated piece of flexible spring steel, and wherein the elongated piece of flexible steel is threaded through the sheathing and the sheathing is in turn threaded through the buoyant sleeve.

2. The fishing bait pen of claim 1 wherein in the collapsed configuration, a half section of the upper floating support lies directly adjacent a half section of the lower member.

3. The fishing bait pen of claim 1 wherein in the collapsed configuration, the respective half sections generally lie one over the other.

4. The fishing bait pen of claim 1 wherein in the collapsed configuration segments of both the upper support and lower member cross and the crossing occurs at areas that lie generally outwardly of the center of the fishing bait pen when disposed in the collapsed configuration.

5. The fishing bait pen of claim 1 wherein the at least one elongated piece of flexible spring steel includes at least one elongated piece of spring steel that is relatively thin and narrow.

6. The fishing bait pen of claim 1 wherein in the operative mode each of the upper floating support and the lower member form circular configurations and wherein when the fishing bait pen is collapsed both the upper floating support and the lower member have memory that urges the upper floating support and the lower member to spring back to the open circular configuration that the upper floating support and lower member assume in the operative mode.

7. The fishing bait pen of claim 1 wherein the lower member includes at least one elongated piece of spring steel.

8. The fishing bait pen of claim 7 wherein the lower member includes a sheathing surrounding the elongated piece of spring steel.

9. The fishing bait pen of claim 1 wherein the lower member includes at least one elongated piece of spring steel and wherein the spring steel is disposed in the lower member such that at certain locations at least two segments of spring steel extend adjacent each other.

10. The fishing bait pen of claim 9 wherein the lower member includes at least one elongated piece of spring steel and wherein the spring steel is coiled such that the spring steel extends for more than one revolution.

11. A collapsible fishing bait pen comprising:
   a. an upper floating member;
   b. a container for holding fishing bait having a mesh construction and connected to the upper floating member;
   c. the container having one or more sides;
   d. the upper floating member including at least one closed loop spring steel member normally assuming an operable configuration wherein the closed loop spring steel member forms a generally circular shape;
   e. the fishing bait pen configured to assume a collapsed configuration, and wherein when the fishing bait pen is in the collapsed configuration the closed loop spring steel member assumes a twisted, coiled and collapsed configuration wherein the closed loop spring steel member includes two half sections that are coiled and disposed in side-by-side relationship where the effective cross sectional area of the closed loop spring steel member in the twisted, coiled and collapsed configuration is substantially less than the cross sectional area of the closed loop spring steel member in the openable configuration;
f. wherein in the coiled and collapsed configuration the closed loop spring steel member is biased towards assuming the operable configuration;
g. wherein in the twisted, coiled and collapsed configuration, the closed loop spring steel member includes at least two loops disposed generally in side-by-side relationship;
h. wherein the upper floating member includes an elongated generally flat, thin piece of spring steel having opposed ends interconnected, and wherein the elongated piece of spring steel is encapsulated in a sheathing; and
i. wherein the upper floating member includes a buoyant sleeve having an opening and wherein the sheathing is contained within the opening of the buoyant sleeve while the spring steel is encapsulated in the sheating.

12. The collapsible fishing bait pen of claim 11 wherein the fishing bait pen includes a lower member comprising at least one piece of spring steel and wherein the fishing bait pen assumes a collapsed configuration by bringing the upper and lower members together and twisting and coiling the members together to form a coiled and collapsed configuration.

13. The collapsible fishing bait pen of claim 11 wherein in the coiled and collapsed configuration the closed loop spring steel member assumes a cross sectional area of less than 50% of the cross-sectional area of the closed loop spring steel member when in the open configuration.

14. The collapsible fishing bait pen of claim 11 including a lower member that also includes a spring steel member and wherein the fishing bait pen is adapted to assume a collapsed configuration where the upper and lower members lie adjacent each other and are twisted and coiled to form a series of loops, and wherein both the closed loop spring steel member of the upper floating member and the spring steel member of the lower member are biased when in the collapsed configuration to assume an open configuration.

15. The collapsible fishing bait pen of claim 11 wherein the fishing bait pen includes a lower member having a spring steel member associated therewith and wherein the fishing bait pen is configured to assume a collapsed configuration where the fishing bait pen assumes a stacked configuration where the upper floating member and the lower member are each formed into at least two loops that are disposed in side-by-side relationship.

16. The collapsible fishing bait pen of claim 15 wherein both the upper floating member and the lower member include at least one elongated piece of spring steel.

17. The collapsible fishing bait pen of claim 11 wherein both the upper floating member and a lower member that forms a part of the fishing bait pen include at least one elongated piece of spring steel that is housed within a sleeve or sheeting.

18. The collapsible fishing bait pen of claim 11 wherein the fishing bait pen includes a lower member comprising at least one piece of spring steel and wherein the fishing bait pen assumes a collapsed configuration by bringing the upper and lower members together and twisting or coiling the members together to form a coiled and collapsed configuration where both the upper floating member and the lower member are coiled and twisted together and assume FIG. 8 configurations with half sections of the respective FIG. 8 configurations overlapped; and wherein in the coiled and collapsed configuration the fishing bait pen assumes a cross sectional area of less than 50% of the cross sectional area of the closed loop steel member when in the open configuration.

* * * * *